Patented Dec. 10, 1929

1,738,518

UNITED STATES PATENT OFFICE

FRANK C. AXTELL, OF SOUTH PASADENA, CALIFORNIA, ASSIGNOR TO AXTELL RESEARCH LABORATORIES, INC., OF LOS ANGELES, CALIFORNIA, A CORPORATION OF CALIFORNIA

METHOD OF DISTILLING REFINED, CRACKED OILS WITHOUT AVOIDABLE DECOMPOSITION OR DISCOLORATION

No Drawing.   Application filed February 8, 1927.   Serial No. 166,817.

My present invention relates to the production of refined hydrocarbon products such as gasoline derived from so-called cracked distillates.

It is known to those skilled in the art that when cracked petroleum distillates are refined or purified by the ordinary method of treatment with more or less highly concentrated sulphuric acid (or with other acid or mixture derived from sulphuric acid) such sulphuric acid or derivative thereof reacts with certain constituents of such cracked distillates to form compounds (as dialkyl sulphates) which, in themselves, are of a perfectly neutral and stable character at ordinary temperatures; and that, when such refined distillate is distilled, by the time the temperature reaches about 350° F. to 370° F. the compounds referred to are or may be decomposed,—with liberation of sulphuric and sulphurous acids. One or both of these acids thereupon react with the oil contained in the distilling apparatus, with the result that such oils are often badly polymerized, oxidized and/or carbonized,—the distillate becoming yellow and the oil contained in the still becoming black and being rendered commercially almost or entirely worthless; and it is a primary object of my invention to provide means and methods whereby cracked oil, undergoing distillation, is stabilized against the action of the sulphur acids liberated by the decomposition of the bodies referred to.

I have discovered that when a refined (acid-treated and neutralized) cracked distillate, containing the unstable compounds referred to is distilled in the presence of a suitable stabilizing agent (an agent which has or which yields a substance having a greater affinity for the sulphur acids liberated by the decomposition than have the hydrocarbon oils for such acids) I am able to continue the distillation, through and beyond that range of temperature in which the decomposition occurs, without discoloration of the distillate or the still base; and it is an object of this invention, by executing a distillation of refined cracked products or similar oils in the presence of such a stabilizing agent to increase the quantity and improve the quality of gasolines and similar light products, as obtained from cracked distillates.

It is known that cracked distillates contain relatively large quantities of unsaturated bodies; and that these bodies are not only of high fuel value but capable of contributing, as when present in a proportion amounting to about 6% or more to highly advantageous "anti-knock" effects; but the conservation of the mentioned unsaturated bodies has been complicated by the fact that when a previously acidified and neutralized cracked distillate is heated to a temperature substantially above 300° F., as for the purpose of separating gasoline fractions therefrom, the high temperatures which are necessary to the distillation have incidentally resulted in the mentioned very undesirable polymerizing and discoloring effects; and it is accordingly an object of my present invention to provide means and methods for the conservation of the mentioned unsaturates.

While I commit myself to no specific theory as to the advantageous effects which I obtain by distilling in the presence of a suitable stabilizing agent, it is my inference that the agent referred to, by neutralizing the sulphuric acid radicle as fast as formed, obviates an attack by said sulphuric acid radicle upon unsaturates and other hydrocarbons, and thereby prevents those polymerizing and carbonizing actions by which the still base is, in the absence of such stabilizing agent, likely to be deleteriously affected.

As implied above, an essential feature of my present invention is the execution of a distillation of cracked distillates in the presence of a stabilizing agent yielding a basic radicle,—so that the distillation can be carried to a desired end point without those polymerizing and carbonizing effects which have heretofore commonly appeared after the condensation of about 70% of the obtainable yield,— heating above this point in the absence of a stabilizing agent having heretofore been found to ruin both the distillate and the still base, apparently by reason of the liberation of sulphuric acid under temperature conditions which favor its polymerizing and/or carbonizing action, if it is not promptly neutralized, as fast as formed.

Other objects of my invention, which permit of the use of a very inexpensive stabilizing agent such as soda ash, and which permits of the use of steam for a distillation effect, may be best appreciated from the following illustration of a specific embodiment thereof.

Adding to each barrel of a suitably refined, cracked distillate, about five or six pounds of sodium carbonate or potassium carbonate (as, soda ash in solution or in suspension or in a dry and finely subdivided state), I find that although the sodium carbonate or its equivalent, when dry, at first floats in a uniform and well-distributed manner throughout the oil as the same reaches a temperature of about 300° F. to 370° F., without the oil undergoing deterioration in color, the carbonate becomes viscous or "creamy" in consistency, at about 370° F.; and that, in undergoing either "fire" or "steam" distillation, a refined, neutralized, cracked oil, when heated in this manner, ordinarily undergoes no deterioration below an end point such at 410° F. to 437° F. The quantity of soda ash, or its equivalent, employed should be understood to depend upon the origin and history and consequent character of the oil to be distilled.

I have found it advantageous, in advance of a distillation executed in the indicated manner, to add a proportion of a suitably refined hyrocarbon distillate, such as kerosene, to a cracked distillate, to produce a still base and, for an enhancement of the yield of gasoline, and to retain high boiling impurities; and that sodium hydroxide and potassium hydroxide are not so suitable as the sodium or potassium salts of volatile and non-oxidizing acids (the alkali salts of aliphatic acids, such as acetic acid, being objectionable only by reason of their cost) sodium and potassium hydroxide being themselves liable to produce polymerizing and discoloring effects. It will also be understood that the salts of certain of the volatile and non-oxidizing acids, such as hydrochloric acid, are undesirable for the same reason, and for this reason I prefer to limit my stabilizing agents to alkali salts of volatile non-oxidizing non-polymerizing acids. It might be mentioned at this point, that, although carbonic acid is not ordinarily thought of as a volatile acid, it may in relation to the present process be considered as such, in that when a carbonate is decomposed as, for instance, by sulphuric acid, the ultimate products of decomposition are a sulphate, carbonic enhydride and water, which are volatile and I may mention, in conclusion, that although this described use of an alkali or decomposable salt in the fractionating of cracked distillates is entirely suitable for use in processes such as are set forth in my copending application, Serial No. 157,427, filed December 27th, 1926, (disclosing a method of using benzol and of its homologues in conection with sulphuric acid and in a manner immaterial to my present invention) the method herein described and claimed is entirely suitable for use in the production of high grade gasolines, of superior quality and maximum yield, from cracked distillates which have been treated with ordinary sulphuric acid and subsequently neutralized in any ordinary or preferred manner,—with the added result that the residual still base is obtained in the form of a stable, light-colored oil of commercial value, instead of as a highly polymerized, partially carbonized, acid and practically valueless product.

Although I have herein described a single complete embodiment of my invention, it should be understood not only that various details thereof might be independently used, but also that numerous modifications, additional to those suggested herein, might be devised by workers skilled in the arts to which this case relates, without involving the slightest departure from the spirit and scope of my invention as the same is indicated above and in the following claims.

I claim as my invention:

1. In the production of light hydrocarbon oils from cracked distillates, the method of obtaining a separation subsequent to an acid treatment and a neutralization which comprises: executing a distillation in the presence of a stabilizing agent, said stabilizing agent consisting solely of an alkali metal salt of a volatile, non-polymerizing non-oxidizing acid of which the anhydride is volatile.

2. In the production of light hydrocarbon oils from cracked distillates, the method of obtaining a separation subsequent to an acid treatment and a neutralization which comprises: executing a distillation in the presence of a stabilizing agent, said stabilizing agent being an alkali metal carbonate added in the ratio of about five or six pounds per barrel of oil treated.

3. In the production of light hydrocarbon oils from cracked distillates, the method of obtaining a separation subsequent to an acid treatment and a neutralization which comprises: executing a distillation in the presence of a non-polymerizing alkaline stabilizing agent in a subdivided state.

4. In the production of light hydrocarbon oils from cracked distillates, the method of obtaining a separation subsequent to an acid treatment and a neutralization which comprises: executing a distillation in the presence of a stabilizing agent, said stabilizing agent consisting solely of an alkali metal carbonate.

In testimony whereof, I have hereunto set my hand at Los Angeles, California, this 3rd day of February, 1927.

FRANK C. AXTELL.